(12) United States Patent
Yoon et al.

(10) Patent No.: US 8,718,705 B2
(45) Date of Patent: May 6, 2014

(54) DUAL MODE COMMUNICATIONS DEVICE AND METHOD OF IMPROVING DATA RATE THEREOF

(75) Inventors: Chul Hwan Yoon, Gyunggi-do (KR); Seong Geun Kim, Gyunggi-do (KR); Youn Suk Kim, Gyunggi-do (KR); Sung Jae Yoon, Gyunggi-do (KR); Jae Hyouck Choi, Gyunggi-do (KR); Dae Seok Jang, Gyunggi-do (KR); Sang Wook Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/331,887

(22) Filed: Dec. 20, 2011

(65) Prior Publication Data
US 2013/0072187 A1 Mar. 21, 2013

(30) Foreign Application Priority Data
Sep. 16, 2011 (KR) .................. 10-2011-0093514

(51) Int. Cl.
*H04M 1/00* (2006.01)

(52) U.S. Cl.
USPC .................. 455/552.1; 455/550.1

(58) Field of Classification Search
USPC ............. 455/127.4, 150.1, 164.1, 426.1, 434, 455/435.1–435.3; 370/328, 330–339, 352
See application file for complete search history.

(56) References Cited

U.S. PATENT DOCUMENTS

| | | | |
|---|---|---|---|
| 6,201,952 B1* | 3/2001 | Shimizu et al. | 455/180.1 |
| 7,190,737 B2* | 3/2007 | Okamoto | 375/286 |
| 2002/0059434 A1* | 5/2002 | Karaoguz et al. | 709/228 |
| 2007/0191020 A1 | 8/2007 | Fischer et al. | |

FOREIGN PATENT DOCUMENTS

| | | |
|---|---|---|
| JP | 10-093473 | 4/1998 |
| JP | 2006-262314 | 9/2006 |
| KR | 2005-0089643 A | 9/2005 |

OTHER PUBLICATIONS

Korean Office Action, and English translation thereof, issued in Korean Patent Application No. 10-2011-0093514 dated Oct. 24, 2012.

* cited by examiner

*Primary Examiner* — Marisol Figueroa
*Assistant Examiner* — Erica Navar
(74) *Attorney, Agent, or Firm* — McDermott Will & Emery LLP

(57) ABSTRACT

There are provided a dual mode communications device and a method of improving a data rate thereof. The dual mode communications device according to the embodiment of the present invention may include a selection unit 100 connecting antenna terminals to receive terminals or transmit terminals, a receive path circuit unit allowing RF receive signals from each of the first and second antennas to pass therethrough, a transmit path circuit unit providing RF transmit signals to the transmit terminals of the selection unit, an RF circuit unit converting the RF receive signals from the receive path circuit unit into baseband signals and converting the baseband signals to be transmitted into the RF transmit signals, and a baseband circuit unit performing control and signal processing of the selection unit in a single communications mode among a dual mode and a single mode.

5 Claims, 4 Drawing Sheets

DUAL MODE COMMUNICATIONS DEVICE AND METHOD OF IMPROVING DATA RATE THEREOF

CROSS-REFERENCE TO RELATED APPLICATIONS

This application claims the priority of Korean Patent Application No. 10-2011-0093514 filed on Sep. 16, 2011 in the Korean Intellectual Property Office, the disclosure of which is incorporated herein by reference.

BACKGROUND OF THE INVENTION

1. Field of the Invention

The present invention relates to a dual mode communications device capable of increasing a data rate by using different communications channels simultaneously and a method of improving a data rate thereof.

2. Description of the Related Art

Generally, existing communications networks, that is, global system for mobile communications (GSM) networks and digital cordless system (DCS) networks are relatively slow in data transmission rates, compared with a wide-band-code division multiple access (WCDMA) network, or the like.

In existing communications network environments, in order to improve data rates, there is a need to build new base stations, or the like.

Existing communications networks, as described above, perform transmission and reception in a time division manner and therefore, transmit for a predetermined time and receive for a predetermined time.

Accordingly, the method of building new base stations, a method of increasing data transmission rates in existing communications networks, increases costs. Therefore, a need exists for a method of increasing data transmission rates without increasing costs.

SUMMARY OF THE INVENTION

An aspect of the present invention provides a dual mode communications device capable of boosting data rates by using different communications channels simultaneously, and a method of improving data rates thereof.

According to an aspect of the present invention, there is provided a dual mode communications device, including: a selection unit connecting antenna terminals connected to first and second antennas to a receive terminal and a transmit terminal; a receive path circuit unit connected to the receive terminal of the selection unit to allow a radio frequency (RF) receive signal from each of the first and second antenna to pass therethrough; a transmit path circuit unit providing an RF transmit signal to the transmit terminal of the selection unit; an RF circuit unit converting the RF receive signal from the receive path circuit unit into a baseband signal and converting the baseband signal to be transmitted into the RF transmit signal; and a baseband circuit unit performing control and signal processing of the selection unit in a single communications mode among a dual mode using a dual band having a predetermined high band and low band and a single mode using a predetermined single communications band, according to a communications environment.

The receive path circuit unit may include: a first filter passing a high-band RF receive signal included in the dual mode therethrough; and a second filter passing a low-band RF receive signal included in the dual mode therethrough.

The transmit path circuit unit may include: a first power amplifier amplifying power of the high-band RF transmit signal included in the dual mode; and a second power amplifier amplifying power of the low-band RF receive signal included in the dual mode.

The baseband circuit unit may determine whether dual band communications are possible, based on quality of service, indicating a network connection state included in the RF receive signal.

The baseband circuit unit may merge data packets respectively corresponding to the high-band baseband signal and the low-band baseband signal from the RF circuit unit at the time of reception so as to recover data, divide the data packet to be transmitted into high-band and low-band data packets at the time of transmission and provide the baseband signal including the divided data packets to the RF circuit unit, in the case of the dual mode.

The baseband circuit unit may allow pairing information to be included in each of the high-band baseband signal and the low-band baseband signal at the time of dividing the baseband signals and may use paired signals included in each of the high-band baseband signal and the low-band baseband signal at the time of merging the baseband signals.

The baseband circuit unit may perform single band communications by being switched to the single mode when a data capacity to be transmitted is lower than a predetermined data capacity.

According to another aspect of the present invention, there is provided a method of improving a data rate performed in a dual mode communications device, including: scanning neighboring base stations; determining whether dual band communications are possible, based on signals from the scanned neighboring base stations; performing the dual band communications in the dual mode, simultaneously using the predetermined two communications bands when it is determined that the dual band communications are possible; and performing single band communications in a single mode using the predetermined single communications band when it is determined that the dual band communications are not possible.

The determining may be performed to determine whether the dual band communications are possible, based on the quality of service status included in the RF receive signal.

In the performing of the dual band communications, the data packets respectively corresponding to the high-band and low-band baseband signals from the RF circuit unit may be merged with each other at the time of reception so as to recover data, the data packets to be transmitted may be divided into the high-band and low-band data packets, and the baseband signals including the divided data packets may be provided to the RF circuit unit.

The performing of the dual band communications may allow pairing information to be included in each of the high-band baseband signal and the low-band baseband signal at the time of dividing the baseband signals and may use paired signals included in each of the high-band baseband signal and the low-band baseband signal at the time of merging the baseband signals.

In the performing of the dual band communications, the single band communications may be performed by the dual band communications being switched to a single mode when the data capacity to be transmitted is lower than a predetermined data capacity.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
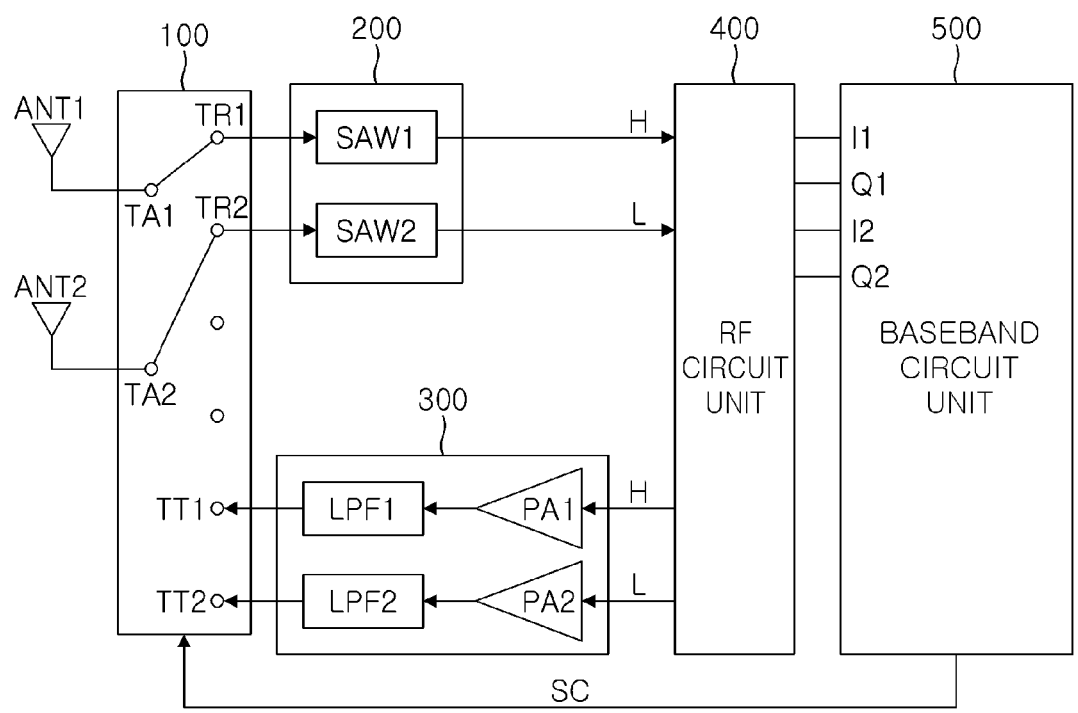
FIG. 1 is a block diagram of a dual mode communications device according to an embodiment of the present invention.

Exemplary embodiments of the present invention will now be described in detail with reference to the accompanying drawings.

The present invention should not be construed as being limited to the embodiments set forth herein and the embodiments thereof may be used to assist in understanding the technical idea of the present invention. Like reference numerals designate like components having substantially the same constitution and function in the drawings of the present invention.

Hereinafter, a dual mode communications device according to an embodiment of the present invention will be described with reference to FIGS. 1 and 3 through 7.

First, FIG. 1 is a block diagram of a dual mode communications device according to an embodiment of the present invention.

Referring to FIG. 1, the dual mode communications device according to the embodiment of the present invention may include a selection unit 100 connecting antenna terminals TA1 and TA2 connected to first and second antennas ANT1 and ANT2 to receive terminals TR1 and TR2 or transmit terminals TT1 and TT2, a receive path circuit unit 200 connected to the receive terminals TR1 and TR2 of the selection unit 100 to allow RF receive signals (SRs) from each of the first and second antennas ANT1 and ANT2 to pass therethrough, a transmit path circuit unit 300 providing RF transmit signals to the transmit terminals TT1 and TT2 of the selection unit 100, an RF circuit unit 400 converting the RF receive signals from the receive path circuit unit 200 into baseband signals and converting the baseband signals to be transmitted into the RF transmit signals, and a baseband circuit unit 500 performing control and signal processing of the selection unit in a single communications mode among a dual mode using a dual band having a predetermined high band and low band and a single mode using a predetermined single communications band according to a communications environment.

In this case, the low band and the high band of the dual mode may be different for each region and country. For example, the low band and the high band may be GSM 900 and DCS 1800 in Europe, GSM 850 and PCS 1900 in USA, and CDMA 800 and PCS 1900 in Korea.

First, a transmit (TX) process in the dual mode communications device according to the embodiment of the present invention will be described.

Referring to FIG. 1, the baseband circuit unit 500 may control the selection unit 100 in a transmit state to perform the transmit signal processing, in the single communications mode among the dual mode using the dual band having the predetermined high band and low band and the single mode using the predetermined single communications band, according to the communications environment.

In this case, the baseband circuit unit 500 may determine whether dual band communications can be performed, based on quality of service (QoS), indicating a network connection state included in the RF receive signals.

Figure 3:
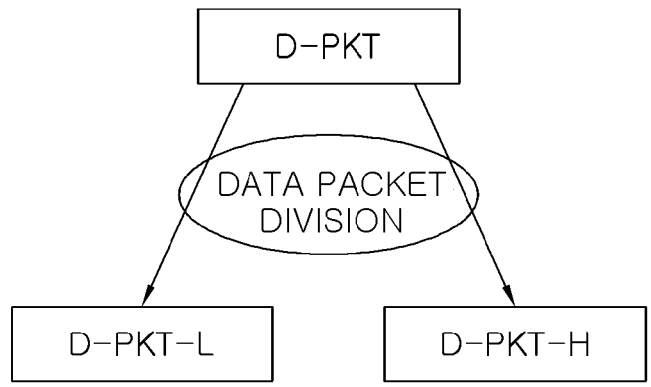
FIG. 3 is a diagram for describing data packet division according to the embodiment of the present invention.

FIG. 3 is a diagram for describing data packet division according to an embodiment of the present invention.

For example, referring to FIG. 3, in the case of the dual mode, the baseband circuit unit 500 may divide a data packet (D-PKT) to be transmitted into high-band data and low-band data packets D-PKT-H and D-PKT-L at the time of transmission, and may provide baseband signals including the divided data packets to the RF circuit unit 400.

In this case, as a method of dividing the data to be transmitted, a method of dividing the data to be transmitted into a predetermined capacity in the overall size of the data packet or a method of dividing the data to be transmitted into an I signal and a Q signal when the data to be transmitted includes an I signal and a Q signal may also be used.

In this case, the baseband circuit unit 500 may allow pairing information to be included in each of the high-band baseband signal and the low-band baseband signal at the time of dividing the baseband signal, such that it may be used at the time of signal merging.

Meanwhile, the baseband circuit unit 500 may also perform single band communications by being switched to a single mode when the data capacity to be transmitted is lower than a predetermined data capacity.

Next, the RF circuit unit 400 may convert the baseband signal from the baseband circuit unit 500 into the RF transmit signal and provides the converted RF transmit signal to the transmit path circuit unit 300.

That is, the RF circuit unit 400 converts the baseband signal into the RF signal of a predetermined frequency band that can be transmitted in wireless.

The transmit path circuit unit 300 may provide the RF transmit signal from the RF circuit unit 400 to the transmit terminals TT1 and TT2 of the selection unit 100.

As an example, the transmit path circuit unit 300 may include a first power amplifier PA1 and a second power amplifier PA2. In this configuration, the first power amplifier PA1 may amplify the power of the high-band RF transmit signal included in the dual mode and the second power amplifier PA2 may amplify the power of the low-band RF receive signal included in the dual mode.

In addition, the transmit path circuit unit 300 may further include a first low pass filter LPF1 passing a signal from the first power amplifier PA1 therethrough and a second low pass filter LPF2 passing a signal from the second power amplifier PA2 therethrough.

Therefore, noise included in the signals from the first and second power amplifiers PA1 and PA2 may be removed by the first and second low pass filters LPF1 and LPF2.

Figure 5:
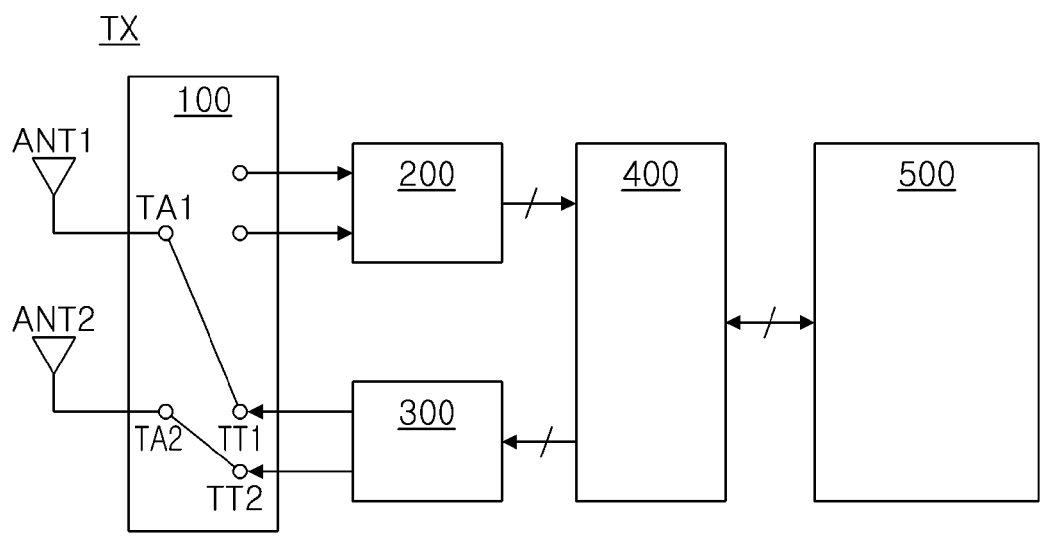
FIG. 5 is a diagram for describing an operation of a selection unit at the time of TX according to the embodiment of the present invention.

As shown in FIG. 5, the selection unit 100 may connect the antenna terminals TA1 and TA2 connected to the first and second antennas ANT1 and ANT2 to the transmit terminals TT1 and TT2 according to the control of the baseband circuit unit 500.

Therefore, the RF signal through the selection unit 100 may be transmitted through the first and second antennas ANT1 and ANT2.

Next, a receive (RX) process in the dual mode communications device according to the embodiment of the present invention will be described.

Referring to FIG. 1, the baseband circuit unit 500 may control the selection unit 100 in a receivable state in the single communications mode among the dual mode using the dual band having the predetermined high band and low band and the single mode using the predetermined single communications band according to the communications environment.

Figure 6:
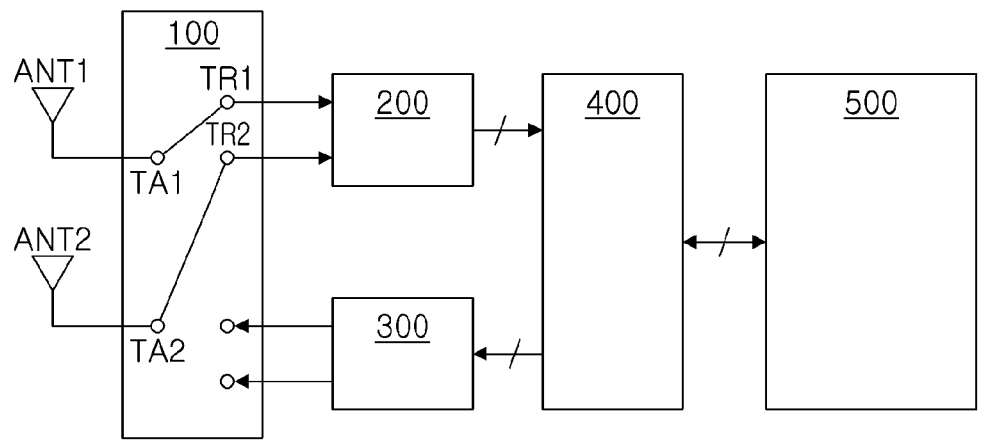
FIG. 6 is a diagram for describing an operation of a selection unit at the time of RX according to the embodiment of the present invention.

In this case, the selection unit 100 may provide the RF receive signal input through the antenna terminals TA1 and TA2 connected to the first and second antennas ANT1 and ANT2 to the receive path circuit unit 200 by connecting the antenna terminals TA1 and TA2 connected to the first and second antennas ANT1 and ANT2 to the receive terminal TR1 and TR2, according to the control of the baseband circuit unit 500, as shown in FIG. 6.

The receive path circuit unit 200 may be connected to the receive terminals TR1 and TR2 of the selection unit 100 to provide the RF receive signal SR from each of the first and second antennas ANT1 and ANT2 to the RF circuit unit 400.

For example, the receive path circuit unit 200 may include a first filter SAW1 and a second filter SAW2. In this case, the first filter SAW1 may allow the high-band RF receive signal included in the dual mode to pass therethrough, and the second filter SAW2 may allow the low-band RF receive signal included in the dual mode to pass therethrough.

The RF circuit unit 400 may convert the RF receive signal from the receive path circuit unit 200 into the baseband signal and may provide the converted baseband signal to the baseband circuit unit 500.

That is, the RF circuit unit 400 may mix the RF receive signal with an oscillator frequency to thus convert the RF receive signal into the baseband signal.

Further, the baseband circuit unit 500 may recover data by processing the baseband signal from the RF circuit unit 400 according to a defined communications protocol.

Figure 4:
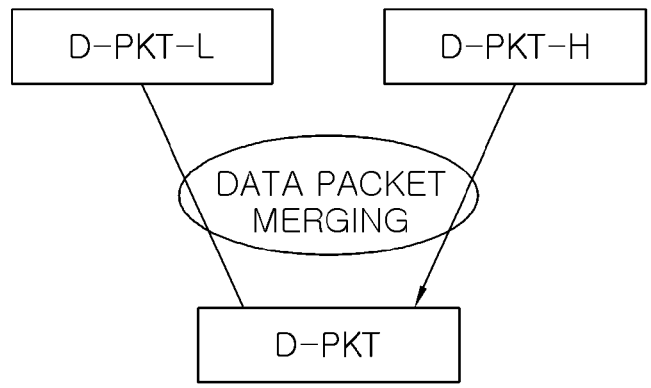
FIG. 4 is a diagram for describing data packet merging according to the embodiment of the present invention.

FIG. 4 is a diagram for describing data packet merging according to an embodiment of the present invention.

Referring to FIG. 4, in the case of the dual mode, the baseband circuit unit 500 may merge the data packets D-PKT-H and D-PKT-L, respectively corresponding to the high-band baseband signal and the low-band baseband signal from the RF circuit unit 400, at the time of reception to recover data therefrom.

In this case, the baseband circuit unit 500 may use paired signals included in the respectively high-band baseband signal and low-band baseband signal at the time of merging the baseband signals.

FIG. 5 is a diagram for describing an operation of the selection unit at the time of TX according to the embodiment of the present invention and FIG. 6 is a diagram for describing an operation of the selection unit at the time of RX according to the embodiment of the present invention.

For example, referring to FIG. 5, the selection unit 100 may connect the antenna terminals TA1 and TA2 connected to the first and second antennas ANT1 and ANT2 to the transmit terminals TT1 and TT2 according to the control of the baseband circuit unit 500 at the time of the TX.

In addition, referring to FIG. 6, the selection unit 100 may connect the antenna terminals TA1 and TA2 connected to the first and second antennas ANT1 and ANT2 to the receive terminals TR1 and TR2 according to the control of the baseband circuit unit 500 at the time of the RX.

Figure 7:
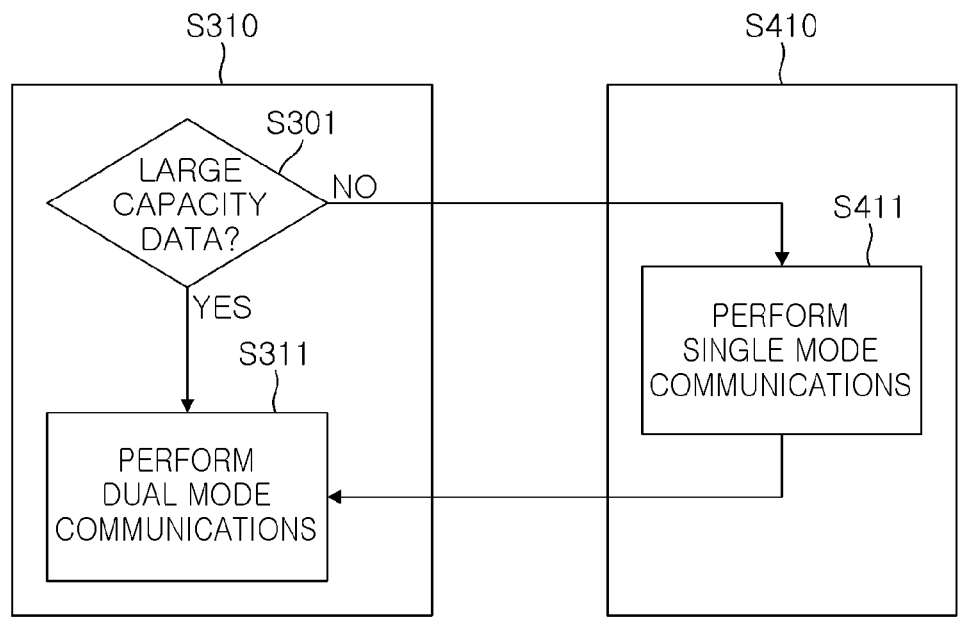
FIG. 7 is a flow chart for describing an operation of switching between a dual mode and a single mode according to the embodiment of the present invention.

FIG. 7 is a flow chart for describing an operation of switching between the dual mode and the single mode according to the embodiment of the present invention.

Referring to FIG. 7, the baseband circuit unit 500 may perform single band communications by being switched to a single mode (S411) when the data capacity to be transmitted is lower than a predetermined data capacity (S301). Thereafter, the dual mode communications may be performed by performing single band communications and again returning to dual band communications (S311).

Hereinafter, the dual mode communications method according to another embodiment of the present invention will be described with reference to FIGS. 2 through 7.

Figure 2:
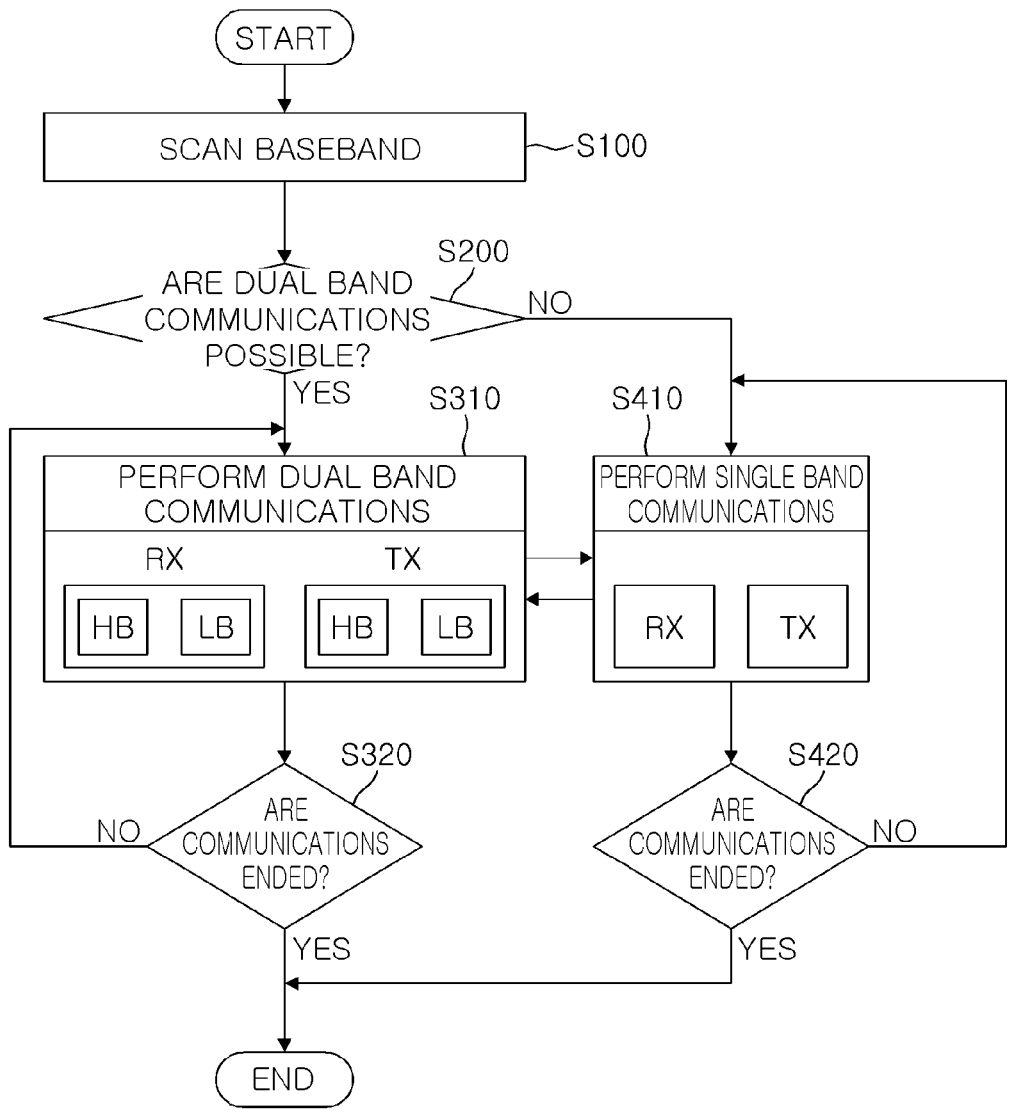
FIG. 2 is a flow chart a dual mode communications method according to another embodiment of the present invention.

First, FIG. 2 is a flow chart of the dual mode communications method according to another embodiment of the present invention.

Referring to FIG. 2, a method of improving a data rate, performed in the dual mode communications device, may include scanning neighboring base stations (S100), determining whether dual band communications are possible, based on the signals from the scanned neighboring base stations (S200), performing dual band communications in the dual mode, simultaneously using predetermined two communications bands (S310 and S320) when it is determined that dual band communications are possible, and performing single band communications in the single mode using the predetermined single communications band when it is determined that dual band communications are not possible (S410 and S420).

The scanning (S100) may be performed to search the neighboring base stations by scanning neighboring base stations. In this case, at least one or two base stations may be searched for.

The determining (S200) may be performed to determine whether dual band communications are possible, based on the signals from the scanned neighboring base stations.

The determining (S200) may be performed to determine whether dual band communications are possible, based on the quality of service (QoS) status included in the RF receive signal. That is, the quality of service (QoS) is a standard representing transmission quality of data in the communications network. A method of classifying network traffic according to the transmission priority thereof and first transmitting traffic having higher priority may be mainly used. Real-time streaming programs such as a moving picture, a video phone, or the like, may relatively efficiently use network bandwidth according to the above-mentioned standard.

In the performing of dual band communications (S310 and S320), dual band communications may be performed in the dual mode, simultaneously using the predetermined two communications bands when dual band communications including the low-pass communications and the high-band communications are possible.

First, the transmit process in the method of improving a data rate of the dual mode communications device according to another embodiment of the present invention will be described.

The performing of dual band communications (S310 and 5320) may be performed to divide the data packet (D-PKT) to be transmitted into high-band and low-band data packets D-PKT-H and D-PKT-L at the time of transmission and provide the baseband signal including the divided data packets to the RF circuit unit 400.

In this case, in the performing of dual band communications (S310 and S320), each of the high-band baseband signal and the low-band baseband signal may include pairing information at the time of dividing the baseband signals.

Thereafter, as shown in FIGS. 1, 2, 4, and 5, the baseband signals to be transmitted from the baseband circuit unit 500 may be provided to the first and second antennas ANT1 and ANT2 through the RF circuit unit 400, the transmit path circuit unit 300 and the selection unit 100.

Next, the receive process in the method of improving a data rate of the dual mode communications device according to another embodiment of the present invention will be described.

As shown in FIGS. 1, 2, 3, and 6, the RF receive signal through the first and second antennas ANT1 and ANT2 may be input to the baseband circuit unit 500 through the selection unit 100, the receive path circuit unit 200, and the RF circuit unit 400.

In the performing of dual band communications (S310 and S320), the data packets D-PKT-H and D-PKT-L respectively corresponding to the high-band and low-band baseband signals from the RF circuit unit 400 may be merged with each other at the time of reception to thus recover data.

In this case, in the performing of dual band communications (S310 and S320) the paired signals included in the respective high-band baseband signal and low-band baseband signal at the time of merging the baseband signals may be used.

Further, in the performing of single band communications (S410 and S420) single band communications in the single mode may be performed by using the predetermined single communications band when dual band communications are not possible.

FIG. 7 is a flow chart for describing an operation of switching between the dual mode and the single mode according to the embodiment of the present invention.

Referring to FIG. 7, the performing of dual band communications (S310 and 5320) may be also provided to perform single band communications by being switched to the single mode (S411) when the data capacity to be transmitted is lower than the predetermined data capacity (S301). Thereafter, the dual mode communications may be performed by performing single band communications and again returning to dual band communications (S311).

As set forth above, according to embodiments of the present invention as described above, the data rate may be increased by simultaneously using different communications channels.

While the present invention has been shown and described in connection with the embodiments, it will be apparent to those skilled in the art that modifications and variations can be made without departing from the spirit and scope of the invention as defined by the appended claims.

What is claimed is:

1. A dual mode communications device, comprising:
   a selection unit having a receive terminal and a transmit terminal and configured to connect antenna terminals connected to first and second antennas to the receive terminal and the transmit terminal;
   a receive path circuit unit connected to the receive terminal of the selection unit to allow a radio frequency (RF) receive signal from each of the first and second antenna to pass therethrough;
   a transmit path circuit unit configured to provide an RF transmit signal to the transmit terminal of the selection unit;
   an RF circuit unit configured to convert the RF receive signal from the receive path circuit unit into a baseband signal and to convert the baseband signal to be transmitted into the RF transmit signal; and
   a baseband circuit unit configured to determine one mode, among a dual mode and a single mode, according to a communication environment and to perform control of the selection unit and a signal processing of the baseband signal in the determined mode, wherein the dual mode simultaneously uses predetermined high band and low band to perform the signal processing of the baseband signal, and the single mode uses a predetermined single communications band to perform the signal processing of the baseband signal, wherein the baseband circuit unit is configured to:
   merge data packets respectively corresponding to the high-band baseband signal and the low-band baseband signal from the RF circuit unit at the time of reception to recover data,
   divide the data packet to be transmitted into high-band and low-band data packets at the time of transmission,
   provide the baseband signal including the divided data packets to the RF circuit unit, in the case of the dual mode,
   allow pairing information to be included in each of the high-band baseband signal and the low-band baseband signal at the time of dividing the baseband signals, and
   use paired signals included in each of the high-band baseband signal and the low-band baseband signal at the time of merging the baseband signals.

2. The dual mode communications device of claim 1, wherein the receive path circuit unit includes:
   a first filter configured to pass a high-band RF receive signal included in the dual mode therethrough; and
   a second filter configured to pass a low-band RF receive signal included in the dual mode therethrough.

3. The dual mode communications device of claim 1, wherein the transmit path circuit unit includes:
   a first power amplifier configured to amplify power of the high-band RF transmit signal included in the dual mode; and
   a second power amplifier configured to amplify power of the low-band RF receive signal included in the dual mode.

4. The dual mode communications device of claim 1, wherein the baseband circuit unit is configured to determine whether dual band communications are possible, based on a quality of service indicating a network connection state included in the RF receive signal.

5. The dual mode communications device of claim 1, wherein the baseband circuit unit is configured to perform single band communications by being switched to the single mode when a data capacity to be transmitted is lower than a predetermined data capacity.

* * * * *